No. 787,857. PATENTED APR. 18, 1905.
G. J. PILGER.
AIR BRAKE GASKET REPLACING TOOL.
APPLICATION FILED FEB. 3, 1905.
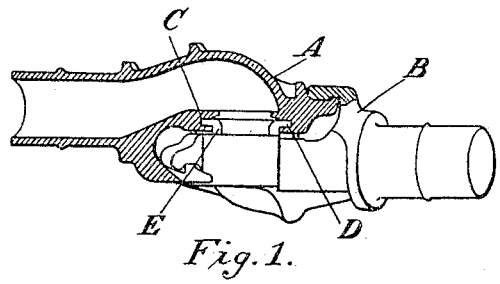
Fig. 1.
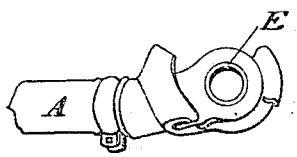
Fig. 2.
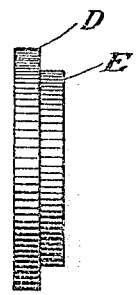
Fig. 3.
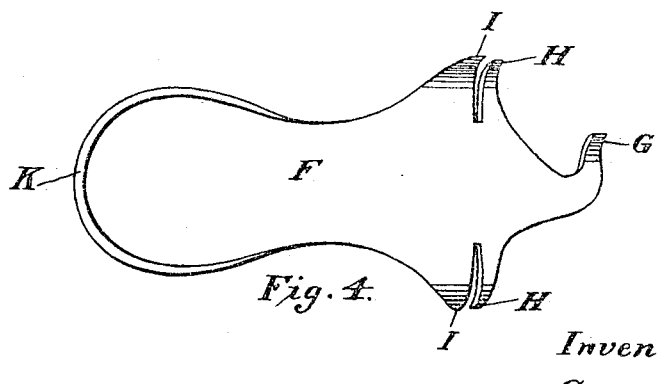
Fig. 4.
Fig. 5.
Witnesses:
Lura Holcomb
Wm. W. Bays.
Inventor:
George J. Pilger,
Per
Geo. D. Mitchell
Attorney.

No. 787,857.

Patented April 18, 1905.

UNITED STATES PATENT OFFICE.

GEORGE J. PILGER, OF SCRANTON, PENNSYLVANIA.

AIR-BRAKE-GASKET-REPLACING TOOL.

SPECIFICATION forming part of Letters Patent No. 787,857, dated April 18, 1905.

Application filed February 3, 1905. Serial No. 243,943.

*To all whom it may concern:*

Be it known that I, GEORGE J. PILGER, a citizen of the United States, residing at Scranton, in the county of Lackawanna and State of Pennsylvania, have invented new and useful Improvements in Air-Brake-Gasket-Replacing Tools, of which the following is a specification.

My invention relates to means for facilitating repairs to leaky air-brake hose-couplings. Its object is to provide a tool specially adapted to remove old and worn-out rubber packing-gaskets between such couplings, clean out the gasket-groove, and place the new gasket in position with the least delay possible. This object I obtain by means of the device illustrated in the accompanying drawings, wherein—

Figure 1 represents a view of the familiar form of air-brake hose-coupling, one member of said coupling being shown in section in order to make clear the position of the rubber packing-gasket. Fig. 2 represents a view of the upper member of said coupling from below, Figs. 1 and 2 being in reduced size. Fig. 3 represents an edge view of the gasket. Fig. 4 represents a top view of my gasket-replacing tool, and Fig. 5 represents an end view of the same.

The same letters refer to the same parts where they occur in more than one view.

Referring now to Fig. 1, A is one member of the coupling and B the other, the two being automatically locked together when in use, as shown, by well-known means not affecting my invention. The member A of the coupling is provided just within its circular mouth at C with an annular groove or recess. In this groove the flange D of the rubber packing-gasket (see Fig. 3) is made to fit so snugly that an air-tight joint is produced when the two parts of the coupling are locked together.

In the course of time this gasket loses its life as a result of wear, age, the presence of oil, &c., and the joint begins to leak, making it necessary to replace the gasket with a new one. This generally happens when the car to which the coupling is attached is in use. It is often difficult to remove the old gasket owing to its flange being stuck in its groove by rust, dirt, &c. The train-hands have to trust to a nail, bent wire, pocket-knife, or the like improvised tool with which to pick the old gasket out and clean out the groove, while a broom-handle or the like is used to push the gasket firmly home. All this consumes an unreasonable amount of time and often causes costly delays, it may be to an entire train. My practical experience having impressed me with the great need of a suitable implement to perform this work I experimented with tools of various shapes until I arrived at the device shown herein.

Referring now to Fig. 4, F represents the body of the tool, which is formed, preferably, of a piece of sheet-steel. At what I shall call the "front" end of the tool the metal is cut away on both sides, so as to leave the irregular hook-shaped projection or prong G, the extremity of which is turned up somewhat and brought to a dull cutting edge. Farther back the tool is provided with a narrow recess or slot on each edge to a distance of approximately a third of its width, leaving a prong H on each side. Still farther back the body of the tool is shaped away for convenience, as shown, which leaves a second prong I on each edge opposite to H. These prongs H and I are in each case curved somewhat at the end, on the one edge backward and on the other forward. This curving of the prongs H H and I I, as well as that of the front prong G, is more clearly shown in the end view, Fig. 5.

The back end of the tool is rounded off, the edge being turned up into a flange K or a separate flange being brazed or otherwise fixed round it. I make the tool of just such a diameter that it will nicely enter the mouth of the coupling.

The various parts of my invention being constructed and arranged as described, its operation is as follows: When an air-brake becomes leaky, I shut off the air, uncouple the two members A and B, and with the sharp upturned prong G of the tool flip or dig out the gasket in the member A. I then insert the tool into the mouth of the member A until the prongs H H enter the annular recess or groove C. A single half-turn of the tool ordinarily suffices to clean the groove out; but the scraping may be continued as long as necessary, the prongs I I serving at the same time to clean away any dirt that may have accumulated on the face of the coupling. I then insert a new gasket in place, using the heel or flanged back end of the tool to press it firmly home. It is obvious that I might make the prongs H I on one side only without departing from the spirit of my invention, though the double-acting form is superior.

Having thus described my invention, what I claim, and desire to secure by Letters Patent, is—

1. A tool for replacing worn-out gaskets in air-brake hose-couplings, consisting of a flat piece of metal or the like shaped with a projecting prong on each side, adapted to enter the gasket-groove of the coupling.

2. A tool for replacing worn-out gaskets in air-brake hose-couplings, consisting of a flat piece of metal or the like, F, provided at its front end with a hook-shaped prong G, turned up at the end, and on each side with a pair of prongs, H, I, turned up at their ends in opposite directions, the prongs H, H, being adapted to enter the gasket-groove of the coupling; said flat piece of metal F being rounded off at its rear end and provided with a peripheral flange K, substantially as described.

In testimony whereof I have signed my name to this specification in the presence of two subscribing witnesses.

GEO. J. PILGER.

Witnesses:
CHAS. R. STONIER,
FREDERICK E. SCOTT.